Patented Sept. 6, 1949

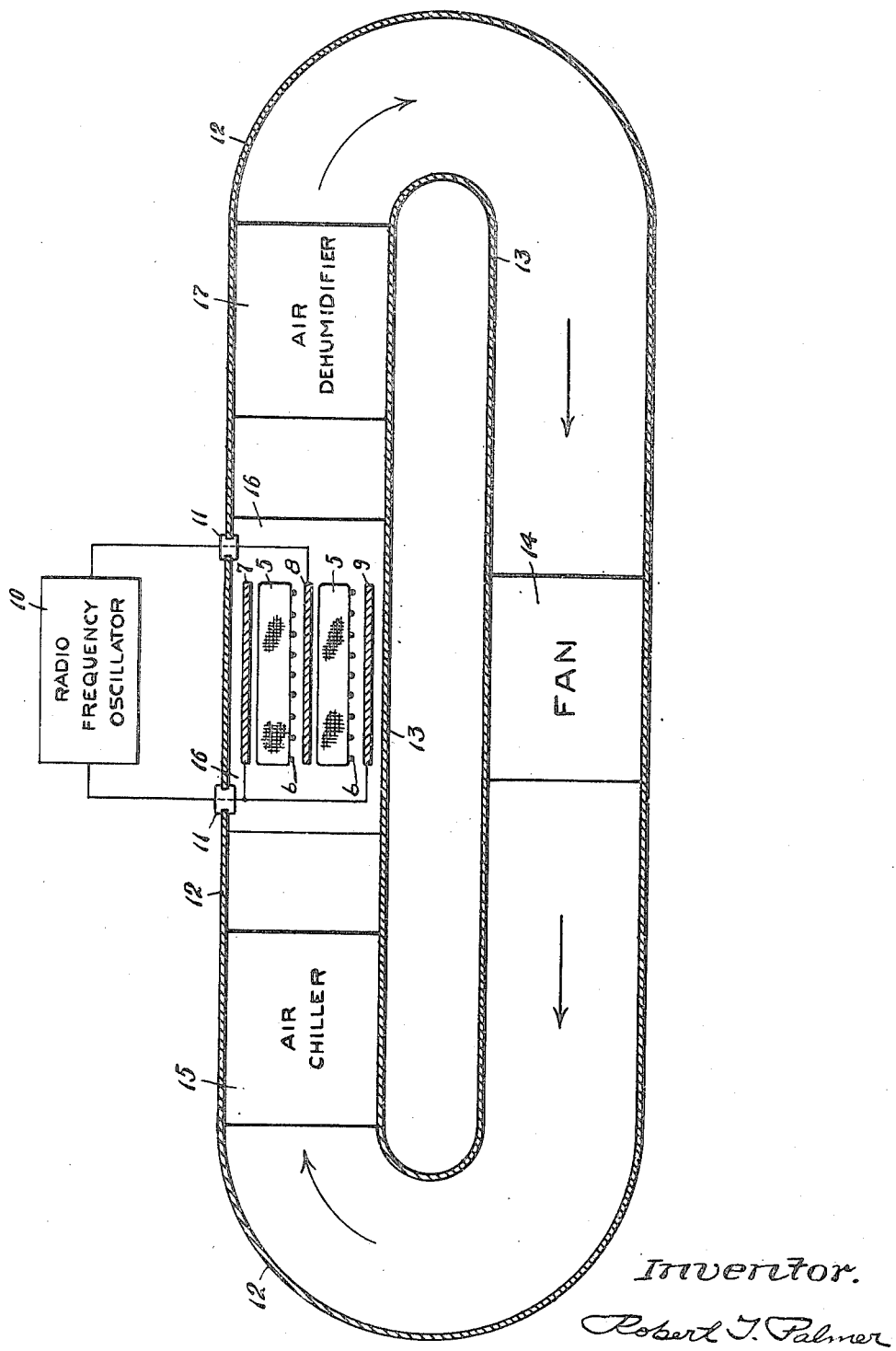

2,480,954

UNITED STATES PATENT OFFICE 2,480,954

DEHYDRATION OF FOODS BY SUBLIMATION

Robert T. Palmer, Sharon, Mass., assignor, by mesne assignments, to Westinghouse Electric Corporation, a corporation of Pennsylvania Application May 6, 1944, Serial No. 534,501

1 Claim. (Cl. 34—1)

This invention relates to the dehydration of foods by sublimation and has as an object the driving of the moisture in foods to be dehydrated by sublimation, to the surface of the foods by electrostatic heat.

In drying by sublimation, ice is formed from the moisture on the surface of the substance being dried, by passing chilled air, which is not saturated, over the said surface. The ice sublimes into the air, thus removing the surface moisture from the said surface. A disclosure of drying blood by sublimation for the preparation of blood plasma may be found in the May, 1943 issue of Mechanical Engineering, the journal of the American Society of Mechanical Engineers.

The advantages of drying food by sublimation as distinguished from drying the food by the application of heat for evaporating the moisture at temperatures above the water freezing temperature, are that the oils, mineral salts, vitamins, and other valuable constitutents are not driven off or destroyed. The food dried by sublimation thus, except for the removal of its water content, retains all of its natural characteristics.

Drying by sublimation is a surface effect so that the moisture within food having substantial thickness is not removed by sublimation. It, obviously, is not possible to drive the moisture to the surface by the application of external heat to the food during the process of sublimation.

This invention provides for driving the moisture within food to its surface by electrostatic heat. Electrostatic heat is internal and is generated by the frictional contact of the food molecules during their movement caused by the reversals of the electrostatic field, the action being known as hysteresis action. The electrostatic heat drives the moisture to the surface of the food where ice is formed and sublimed into a current of unsaturated air chilled to a temperature below the freezing temperature of water at the existing air pressure. The degree of the electrostatic heat, and the temperature of the air current are so regulated that ice is formed and sublimed but not melted.

The invention will now be described with reference to the drawing which is a diagrammatic view of one embodiment of a system which may be used for practicing this invention.

The packages 5 of food to be dried are supported upon the small spaced rods 6. The electrode 7 is arranged above the upper package 5. The electrode 8 is arranged between the packages 5, and the electrode 9 is arranged below the lower package 5.

The electrodes 7 and 9 are interconnected and are connected to one side of the radio frequency oscillator 10, and the center electrode 8 is connected to the other side of the oscillator 10. The wires connecting the electrodes to the oscillator extend through the electrical insulators 11 which extend through the outer wall 12 of the dehydrator.

The outer walls 12 and the inner wall 13 of the dehydrator form a closed, air recirculation passage in which is included the fan 14, the air chiller 15, the dehydration chamber 16 containing the packages of food 5, and the air dehumidifier 17.

The fan 14 may be a conventional propeller or centrifugal fan.

The air chiller 15 may be a conventional air chiller including tubes through which a refrigerant is circulated.

The oscillator 10 may be a conventional vacuum tube type oscillator producing oscillations at say, twenty megacycles, such as are commonly used for electrostatic heating.

The air dehumidifier 17 may be a conventional air dryer containing an adsorbent such as silica gel or an absorbent such as lithium chloride.

The food packages 5 may be inserted in and removed from the dehydration chamber 16 through side doors as is usual in food dryers.

In operation, the oscillator produces alternating electrostatic fields between the electrodes 7 and 8, and 8 and 9, causing the interior of the food in the packages 5 to be heated and to evaporate the moisture and to drive it as vapor to the surface of the food.

The fan 14 draws air through the dehumidifier 17 where its dew point temperature is lowered, and then forces the dehumidified air through the chiller 15. The air is then passed over the surface of the food. The chiller 15 chills the dehumidified air to a temperature above its dew point temperature but sufficiently below the freezing point of water as to form ice from the moisture on the surface of the food, which moisture is condensed thereon from the vapor driven thereto by the electrostatic heat. This ice is continuously sublimed into the air, and is continuously replaced by ice formed from the moisture driven to the surface of the food by the electrostatic heat.

The dehumidifier 17 removes moisture from the air leaving the food and in doing so lowers the dew point temperature and raises the dry bulb temperature of the air through converting latent heat to sensible heat. The air while in the chiller 15 must, of course, be chilled to a sufficiently low temperature, that it can absorb the sensible heat added to the air by the electrostatic heating and can form ice upon the surface of the food.

As the drying of the food progresses, the energy absorbed from the electrostatic field decreases in proportion, thus providing automatic regulation.

The hygroscopic dehumidifier 17 may be replaced as its capacity to remove moisture requires. The food dehydrator may be operated at atmospheric pressure or may be evacuated for lowering the evaporation temperature of water.

The expense resulting from the use of electrostatic heat is believed to be more than justified by the decreased time required for drying, and the expense resulting from the use of refrigeration for drying is believed to be more than justified by the improved product obtained.

While the dehydration has been described as accomplished in a closed air recirculation system, which is preferred, the system need not be closed since moist air could be vented off and dry make-up air added as is common in drying systems.

While one embodiment of the invention has been described for the purpose of illustration, it should be understood that the invention is not limited to the exact apparatus and arrangement of apparatus described, as modifications thereof may be suggested by those skilled in the art without departure from the essence of the invention.

What is claimed is:

The method of dehydrating food which comprises placing the food within an enclosure in an alternating electrostatic field for driving moisture within the food to its surface by electrostatic heat produced within the food, and circulating unsaturated air chilled to a temperature below the freezing temperature of the moisture on the surface of the food, over the surface of the food for forming ice from the moisture on its surface and for subliming the ice.

ROBERT T. PALMER.

REFERENCES CITED

The following references are of record in the file of this patent:

UNITED STATES PATENTS

| Number | Name | Date |
|---|---|---|
| 276,405 | Hoeveler | Apr. 24, 1883 |
| 653,555 | Hart et al. | July 10, 1900 |
| 871,982 | Cooke | Nov. 26, 1907 |
| 872,026 | Stare | Nov. 26, 1907 |
| 1,040,486 | Allen | Oct. 8, 1912 |
| 2,042,145 | Darrah | May 26, 1936 |
| 2,066,847 | McShea | Jan. 5, 1937 |
| 2,098,295 | Kettering et al. | Nov. 9, 1937 |
| 2,320,474 | Ross | June 1, 1943 |
| 2,354,200 | Cutler | July 25, 1944 |

FOREIGN PATENTS

| Number | Country | Date |
|---|---|---|
| 11,910 | Great Britain | 1904 |
| 12,642 | Great Britain | 1905 |
| 12,887 | Great Britain | 1911 |

OTHER REFERENCES

"Electronics Brightest Star," pp. 103 to 105 of Scientific American, September 1943.